United States Patent [19]

Ayers et al.

[11] Patent Number: 4,500,117
[45] Date of Patent: Feb. 19, 1985

[54] PIPELINE CONNECTOR

[75] Inventors: Ray R. Ayers; Robert M. Kipp, both of Houston, Tex.

[73] Assignee: Shell Oil Company, Houston, Tex.

[21] Appl. No.: 444,416

[22] Filed: Nov. 24, 1982

[51] Int. Cl.³ .............................................. F16L 37/00
[52] U.S. Cl. ........................................ 285/3; 285/319; 285/86; 285/323; 285/340
[58] Field of Search ..................... 285/3, 319, 340, 86, 285/89, 374, 2, 381, 322, 323, 339, DIG. 23

[56] References Cited

U.S. PATENT DOCUMENTS

| | | | |
|---|---|---|---|
| 2,994,280 | 8/1961 | Daffin | 285/2 |
| 3,898,163 | 8/1975 | Mott | 285/340 |
| 4,021,062 | 3/1977 | Mariaulle | 285/340 |
| 4,074,912 | 2/1978 | Van Bilderbeek et al. | 285/319 |
| 4,240,651 | 12/1980 | Mariaulle | 285/322 |
| 4,373,753 | 2/1983 | Ayers et al. | 285/319 |
| 4,405,017 | 9/1983 | Allen et al. | 285/3 |
| 4,452,472 | 1/1984 | Crase | 285/3 |

FOREIGN PATENT DOCUMENTS 84078 10/1964 France ............................. 285/340

*Primary Examiner*—Cornelius J. Husar
*Assistant Examiner*—Todd G. Williams

[57] ABSTRACT

A bell-lock mechanical pipeline connector is provided wherein a seal of soft material is wedged into a sealing mode by collet wedge lock fingers which in turn are actuated by a wedging means which is functional upon shearing of a pin.

10 Claims, 3 Drawing Figures

PIPELINE CONNECTOR

BACKGROUND OF THE INVENTION

In both offshore and onshore pipeline construction, the manually welded joint has become the standard by which other forms of pipeline joining are evaluated. Pipe joining, by whatever means, is more costly offshore where weather conditions can severely hinder pipeline construction operations. In recent years, considerable improvements have been made in conventional pipelaying systems, and more specifically in pipe joining processes. Semi-automatic and then fully automatic welding systems have been developed, proven in the field, and now accepted offshore. However, the art remains deficient in the provision of mechanical connectors for diverless, subsea tie-ins of large-diameter pipe in deep water. Accordingly, the present invention is directed to overcoming this deficiency of the art.

REFERENCE TO RELATED APPLICATIONS

The invention of the present application is related to the inventions of application Ser. No. 264,317 filed May 18, 1981; application Ser. No. 335,913 filed Dec. 30, 1981; application Ser. No. 342,536, filed Jan. 25, 1982; and application Ser. No. 443,367 filed Nov. 22, 1982.

SUMMARY OF THE INVENTION

The present invention pertains to a connector for joining a bell-end pipe to a straight-end pipe, which connector includes among its parts, collet wedge fingers encircling the straight-end pipe and insertable into the bell-end pipe, deformable sealing material at the lateral extremity of the collet wedge fingers, driving means for pressing the collet wedge fingers and deformable sealing material into sealing engagement with the bell-end pipe, and locking means attached to the bell-end pipe for maintaining the sealing engagement. Preferably, the driving means includes colleted lock washers enclosed by a drive ring, and the drive ring is releasably attached to the collet wedge fingers by shear pins. Also preferably, the locking means are collet spring fingers which lock the driving means in position.

DESCRIPTION OF THE PREFERRED EMBODIMENT

Figure 1:
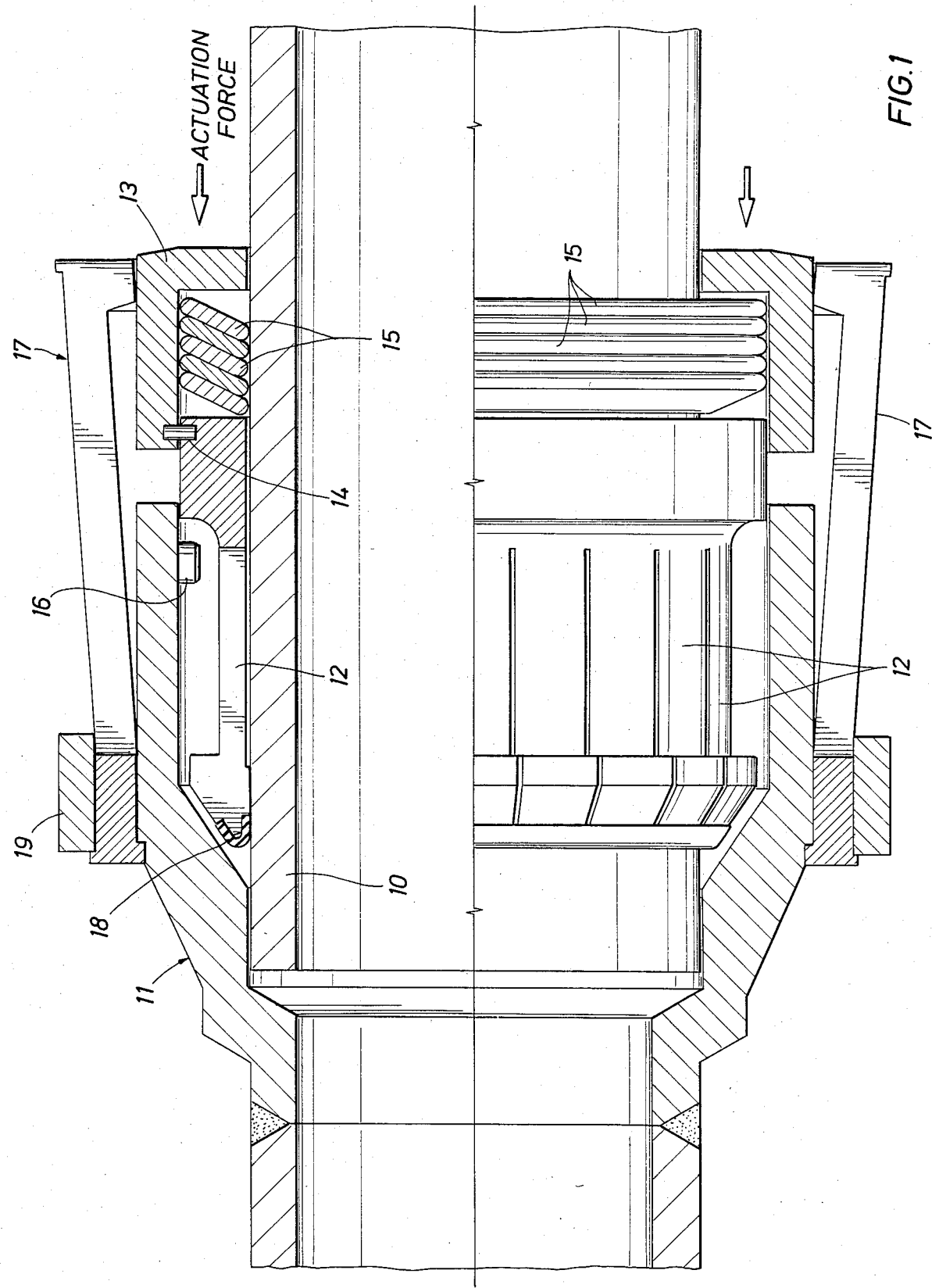
FIG. 1 shows the connector in an unlocked position.

The bell-lock mechanical pipeline connector of the present invention is shown in an unlocked mode in FIG. 1. Pipe end 10 extends inwardly of bell-shaped pipe end 11, and collet wedge lock fingers 12 encircle pipe end 10 and extend inwardly of bell-shaped pipe end 11. Drive ring 13 is attached to collet wedge lock fingers 12 by shear pin 14. Enclosed between lock fingers 12 and drive ring 13 are colleted lock washers 15. Wedge lock stop 16 is attached to bell-shaped end 11 and functionable to limit the inward movement of lock fingers 12 into pipe end 11. Collet hold lock fingers 17 are attached to the exterior of bell-shaped pipe end 11. The colleted lock washers 15 of the present invention are somewhat thicker and radially shorter than the well known Belville washer. Lock washers 15 provide superior gripping properties due to the large change in outside and inside diameter during actuation and the unique load-displacement relationship which is achieved as the washers are flattened under compression. The load-deflection characteristics of the washers are non-linear as a result of the changing shape of the washers during flattening. Within limits, the initial shape of the washers may be chosen to achieve a desirable flattening, or actuation load.

Since a single lock washer does not develop a sufficient shear load transfer area, it is preferable to use multiple washers. Such washers may be spaced apart so that the gripped pipe will not be subjected to excessive pressure. Also, the washers are properly designed to avoid interference with each other when rotated, i.e., compressed. Proper washer spacing may be achieved, in accordance with one embodiment, by the use of smaller diameter "dummy" washers. The "dummy" washers simply function to separate the gripping washers.

Figure 2:
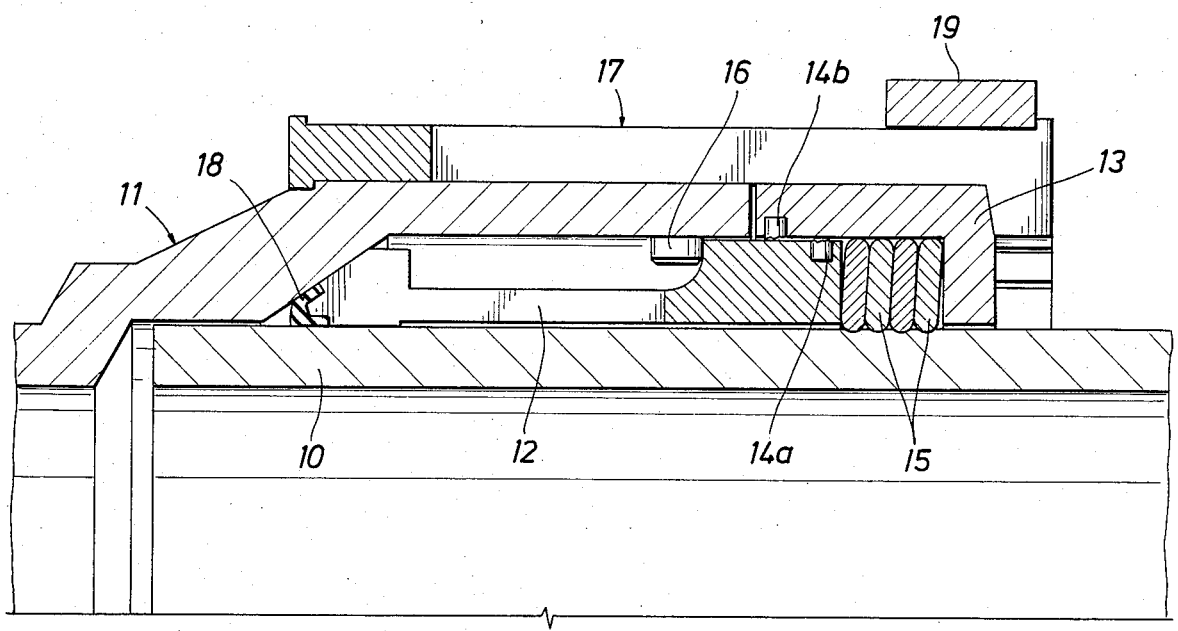
FIG. 2 shows the connector in a locked position.
Figure 3:
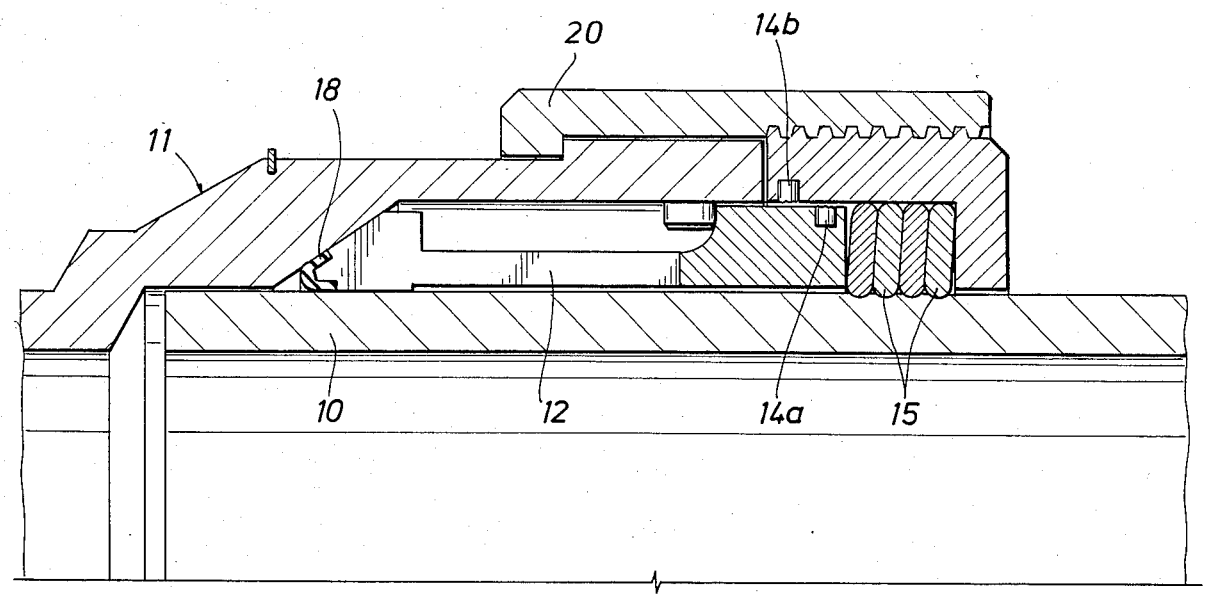
FIG. 3 shows a modification of the connector of FIGS. 1 and 2.

The connector of FIG. 1 is actuated or locked into place by shoving drive ring 13 toward the shoulder of collet wedge lock fingers 12 so that colleted lock washers 15 are compressed into a vertical position. As each washer flattens, its effective radial thickness increases, thereby putting radial pressure against pipe end 10. As shown in FIG. 2, with the connector in a locked position, shear pin 14 is severed into 14(a) and 14(b). Wedge lock stop 16 prevents further forward movement of the lock fingers 12 after soft seal material 18 is jammed into the intersection of pipe end 10 and pipe bell-end 11. Once this occurs, collet lock fingers 17 fall into position behind the shoulder of drive ring 13, thereby effectively locking the connection together and sealing the joint with soft seal material 18. Suitable soft seal materials are, for instance, copper, zinc, lead and combinations thereof.

Instead of the collet lock fingers 17, it is also feasible to use a threaded outer ring 20 which functions by screwing onto drive ring 13.

The foregoing description of the invention is merely intended to be explanatory thereof. Various changes in the details of the described apparatus may be made within the scope of the appended claims without departing from the spirit of the invention.

What is claimed is:

1. A connector for joining a bell-end pipe to a straight-end pipe comprising:
    collet wedge fingers encircling the straight-end pipe and insertable into the bell-end pipe;
    deformable sealing material at the lateral extremity of the collet wedge fingers;
    driving means for pressing the collet wedge fingers and deformable sealing material into sealing engagement with the bell-end pipe; and
    locking means attached to the bell-end pipe for maintaining said sealing engagement.

2. The connector of claim 1 wherein the driving means comprises colleted lock washers enclosed by a drive ring.

3. The connector of claim 2 wherein the drive ring is releasably attached to the collet wedge fingers.

4. The connector of claim 3 wherein the drive ring is releasably attached to the collet wedge fingers by shear pins.

5. The connector of claim 1 wherein a wedge lock stop attached to the inside of the bell-end pipe is functionable to limit movement of the wedge lock fingers into the bell-end pipe.

6. The connector of claim 1 wherein the locking means are collet spring fingers.

7. The connector of claim 6 wherein the collet spring fingers lock the driving means.

8. The connector of claim 7 wherein the driving means comprises colleted lock washers enclosed by a drive ring.

9. The connector of claim 1 wherein the locking means is a threaded outer ring.

10. The connector of claim 9 wherein the threaded outer ring locks the driving means.

* * * * *